(12) United States Patent
Babin et al.

(10) Patent No.: US 7,306,454 B2
(45) Date of Patent: *Dec. 11, 2007

(54) FRONT-MOUNTABLE INJECTION MOLDING NOZZLE

(75) Inventors: Denis Babin, Georgetown (CA); Terry Schwenk, Kenosha, WI (US); Robert Sicilia, Mississauga (CA)

(73) Assignee: Mold-Masters Limited, Georgetown, Ontario (CA)

( * ) Notice: Subject to any disclaimer, the term of this patent is extended or adjusted under 35 U.S.C. 154(b) by 261 days.

This patent is subject to a terminal disclaimer.

(21) Appl. No.: 11/065,166

(22) Filed: Feb. 24, 2005
(Under 37 CFR 1.47)

(65) Prior Publication Data

US 2005/0196486 A1 Sep. 8, 2005

Related U.S. Application Data

(63) Continuation-in-part of application No. 10/968,459, filed on Oct. 20, 2004, which is a continuation-in-part of application No. 10/819,165, filed on Apr. 7, 2004, now Pat. No. 7,179,081.

(60) Provisional application No. 60/460,418, filed on Apr. 7, 2003.

(51) Int. Cl.
B29C 45/20 (2006.01)
(52) U.S. Cl. .................... 425/549; 425/572; 425/588
(58) Field of Classification Search ................ 425/549, 425/572, 588
See application file for complete search history.

(56) References Cited

U.S. PATENT DOCUMENTS

| | | | |
|---|---|---|---|
| 2,770,011 A | 11/1956 | Kelly | |
| 4,212,624 A | 7/1980 | Ando et al. | |
| 4,344,750 A | 8/1982 | Gellert | |
| 4,345,892 A | 8/1982 | Schulte et al. | |
| 4,818,217 A | 4/1989 | Schmidt et al. | |
| 4,836,766 A | 6/1989 | Gellert | |
| 4,902,218 A | 2/1990 | Leonard et al. | |
| 4,981,431 A | 1/1991 | Schmidt | |

(Continued)

FOREIGN PATENT DOCUMENTS

DE  7603206 U  6/1976

(Continued)

OTHER PUBLICATIONS

HTS Hot Runner Systems, Edge Gate Technology for Micromolding, D-M-E Brochure, Dec. 2000.

(Continued)

*Primary Examiner*—Tim Heitbrink
(74) *Attorney, Agent, or Firm*—Medler Ferro PLLC

(57) ABSTRACT

An injection molding apparatus includes a first, rear-mounted nozzle that is coupled to a manifold for receiving a melt stream therefrom. A second, front-mounted nozzle is coupled to the first nozzle by a nozzle link that is provided between the first and second nozzles. A plurality of gate seals are coupled to a forward end of the second nozzle. The gate seals receive melt from a plurality of melt passages and deliver the melt to a plurality of mold cavities through respective gates. The second nozzle is slidably removable from the first nozzle via the nozzle link to facilitate repair or replacement of the gate seals.

26 Claims, 13 Drawing Sheets

U.S. PATENT DOCUMENTS

| | | |
|---|---|---|
| 5,049,062 A | 9/1991 | Gellert |
| 5,051,086 A | 9/1991 | Gellert |
| 5,268,184 A * | 12/1993 | Gellert ............... 425/190 |
| 5,269,677 A | 12/1993 | Gauler |
| 5,324,191 A | 6/1994 | Schmidt |
| 5,494,433 A | 2/1996 | Gellert |
| 5,536,165 A | 7/1996 | Gellert |
| 5,591,465 A | 1/1997 | Babin |
| 5,609,893 A | 3/1997 | Eastwood |
| 5,820,899 A | 10/1998 | Gellert et al. |
| 5,952,016 A | 9/1999 | Gellert |
| 6,666,675 B2 | 12/2003 | Ihara et al. |
| 6,688,875 B2 | 2/2004 | Babin |
| 6,805,549 B2 | 10/2004 | Günther |
| 6,835,060 B2 | 12/2004 | Sicilia |

FOREIGN PATENT DOCUMENTS

| | | |
|---|---|---|
| DE | 3501840 C2 | 7/1986 |
| DE | 42 15 601 A1 | 11/1993 |
| DE | 100 08 722 A1 | 8/2001 |
| JP | 2005041020 A | 2/2005 |
| JP | 2005-132026 | 5/2005 |

OTHER PUBLICATIONS

Schottli, Heisskanal-Systeme Brochure, Oct. 1997.

* cited by examiner

FRONT-MOUNTABLE INJECTION MOLDING NOZZLE

CROSS-REFERENCE TO RELATED APPLICATION

This application is a continuation-in-part of U.S. application Ser. No. 10/968,459, filed Oct. 20, 2004, now U.S. Pat. No. 7,179,081 and also which is a continuation-in-part of U.S. application Ser. No. 10/819,165, filed Apr. 7, 2004, that claims the benefit under 35 U.S.C. § 119(e) of provisional U.S. Appl. No. 60/460,418 filed Apr. 7, 2003, the contents of which are incorporated by reference herein in their entirety.

BACKGROUND OF THE INVENTION

1. Field of the Invention

The present invention relates generally to an injection molding apparatus and, in particular, to a front mountable nozzle that delivers melt to a number of mold cavities spaced around the nozzle.

2. Related Art

Edge gating from a nozzle of an injection molding apparatus through a number of edge gate seals is well known. A multi-cavity edge, or side, gated injection molding apparatus 100 is shown in FIG. 1 as described in U.S. Pat. No. 5,494,433 to Gellert, issued Feb. 27, 1996, which is incorporated in its entirety herein by reference thereto. Generally, the multi-cavity edge-gated injection molding apparatus 100 includes several nozzles 102, one of which is shown in FIG. 1, that are coupled to a manifold 118 to receive a melt stream of moldable material therefrom. Each nozzle 102 is mounted in a cylindrical opening 104 in a mold 106 to convey pressurized melt through a nozzle melt channel 108 to mold gates 110, which lead to mold cavities 112 in mold 106. Mold cavities 112 are spaced radially around nozzle 102. Each mold gate 110 extends through a gate insert 114, which is held in position by a gate insert retainer plate 122. Each mold gate 110 is aligned with a gate seal 116 that is threadably coupled to nozzle 102. As such, the location of gate seals 116 is generally fixed relative to the mold 106.

As illustrated in FIG. 1, manifold 118 is a "floating" manifold, which is positioned below a back plate 120 and coupled to mold 106 through nozzle 102. This arrangement allows for thermal expansion of manifold 118 and nozzle 102 in an axial direction. In such an arrangement, requisite axial thermal expansion is accommodated by having a sliding/telescopic arrangement between a sprue bushing 124 fixed to a mold back plate 120 and manifold 118. However, axial thermal expansion of nozzle 102 is restricted in a direction of the mold cavity by the relatively fixed position of gate seals 1 16. Consequently, gate seals 116 bear the load of both the manifold and the edge-gating nozzle during operation of the injection molding apparatus. Due to the strenuous and repetitive nature of the injection molding process, such a load condition may cause misalignment of the gate seals with their respective mold gates and excessive wear of the gate seals resulting in leakage and more frequent repair and maintenance. In order to access gate seals 116 for repair or maintenance purposes, edge-gated systems often require that the entire system be advanced forward or removed.

As such there exists a need in the injection molding industry for an injection molding apparatus that maintains alignment of a plurality of gate seals with a plurality of respective mold gates and that reduces the load on the gate seals during operation and facilitates access for maintenance.

SUMMARY OF THE INVENTION

According to an embodiment of the present invention there is provided an injection molding apparatus that during operation isolates horizontal gate seals of an edge-gated nozzle from a manifold load by having a dual nozzle arrangement between a mold cavity and the manifold. In the present invention, a rear-mounted nozzle takes the load of the manifold and a front-mounted nozzle with horizontal gate seals is allowed to float freely in order to compensate for misalignment caused by heat expansion during operation. As such, the edge-gated, front-mounted nozzle functions to keep the gate seals properly located to maintain a good seal with each corresponding mold gate.

Each rear-mounted nozzle includes a flange that is held in a corresponding shoulder of a mold plate to limit axial movement of the rear-mounted nozzle in the direction of the front-mounted nozzle. The rear-mounted nozzle flange and mold plate shoulder arrangement supports the load from the manifold but still allows the load from the manifold to be used as sealing means/force between the rear-mounted nozzle and the manifold.

The present invention includes a telescoping linking piece having a melt passage of a relatively constant diameter there through that is used to fluidly connect the melt channels of the rear- and front-mounted nozzles and to accommodate the thermal expansion of the rear-mounted nozzle and the front-mounted nozzle during operation.

An embodiment of the present invention includes an axially-fixed manifold having a manifold channel for receiving a melt stream of moldable material under pressure and for delivering the melt stream to a first nozzle melt channel of a first nozzle. The first nozzle having a flange for seating in a corresponding shoulder of a mold plate. A second, edge-gated nozzle is coupled to a forward end of the first nozzle, the second nozzle having a second nozzle melt channel for receiving the melt stream from the first nozzle melt channel.

This embodiment of the present invention includes a nozzle link having a melt passage of a relatively constant diameter that fluidly couples the first nozzle melt channel and the second nozzle melt channel. A first end of the nozzle link is threadably engaged with the first nozzle and a second end of the nozzle link is slidingly insertable into an aperture in the second nozzle to provide for the second nozzle being slidably removable from the first nozzle with removal of the mold plate.

The second nozzle is provided with a plurality of melt passages that extend from a forward end of the second nozzle melt channel for directing the melt stream toward a plurality of gate seals coupled thereto. A plurality of mold cavities are arranged about the forward end of the second nozzle to receive the melt stream from the plurality of gate seals through a plurality of mold gates. The gate seals are relatively fixed in position in an axial direction to provide horizontal alignment with the mold gates of the mold cavities.

The present invention provides an advantage in that the gate seals bear only the load of the second nozzle instead of bearing the load of the entire manifold system. The present invention provides a further advantage in that the gate seals are more easily accessible for repair, routine maintenance, and/or replacement purposes. In addition, an embodiment of the present invention that includes a heater wrapped about a top and bottom surfaces of a second nozzle provides even heating of the melt, as well as greater thermal control of the melt in the nozzle tip area for improved thermal gating. Also a puck-shaped and/or brick-shaped second nozzle in accordance with the present invention accommodates more mold gates in a smaller area, i.e., reduces the pitch between nozzle tips to provide more locations for nozzle tips radiating and/or extending from a melt channel of the second nozzle to increase production of an injection molding apparatus.

In another embodiment of the present invention, a second nozzle includes a longitudinally extending second nozzle melt channel with a plurality of melt passages that extend at an angle from a forward end of the second nozzle melt channel for directing the melt stream toward a plurality of gate seals coupled thereto. The gate seals are relatively fixed in position to provide alignment with a plurality of mold gates.

BRIEF DESCRIPTION OF THE FIGURES

An embodiment of the present invention will now be described more fully with reference to the accompanying drawings where like reference numbers indicate similar structure.

DETAILED DESCRIPTION OF THE INVENTION

Figure 6:
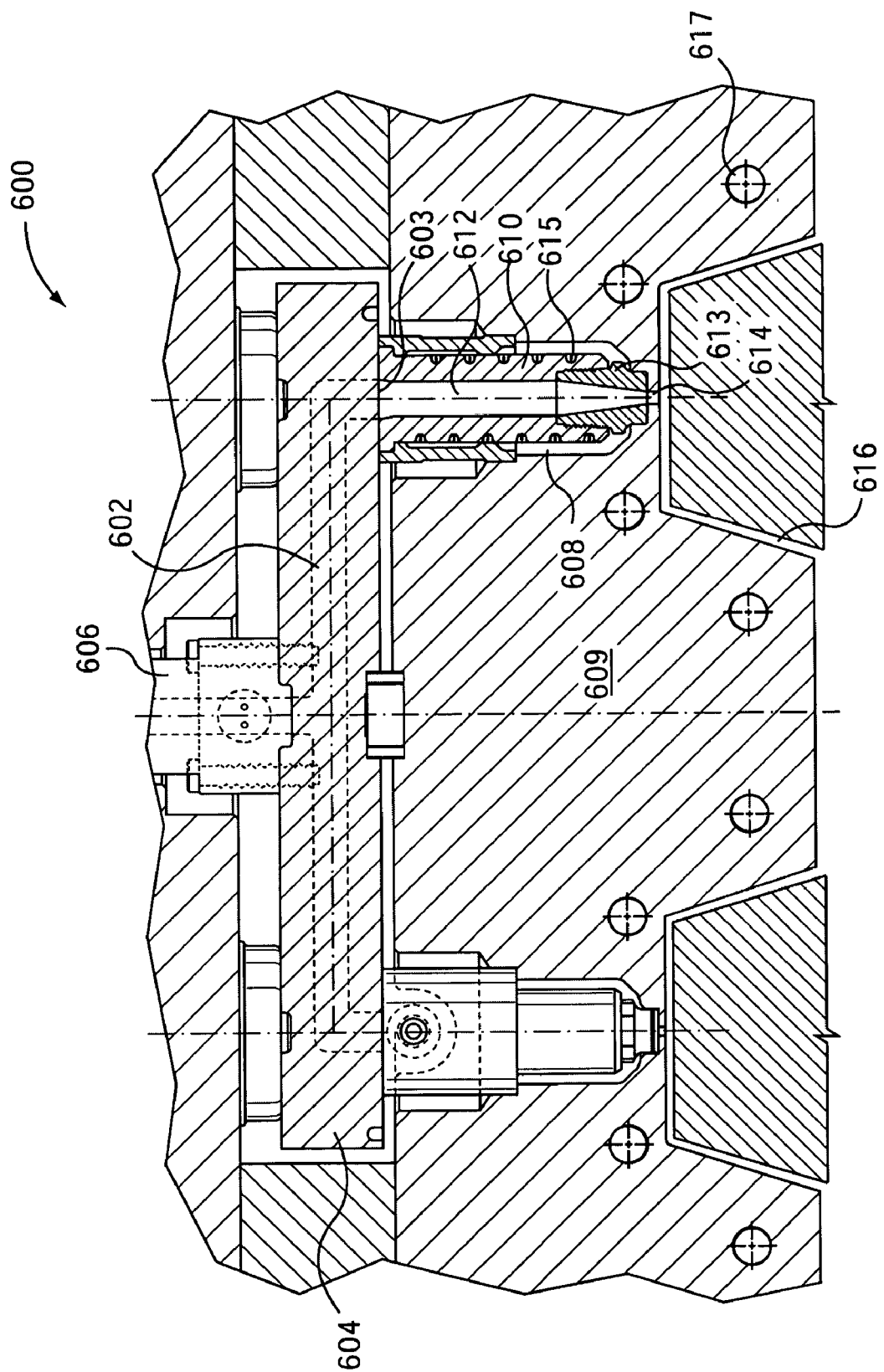
FIG. 6 is a cross-sectional view of an injection molding apparatus in which the present invention may be used.

The present invention is intended to be used in an injection molding environment as shown in FIG. 6, which is a partial cross-sectional view of an injection molding system 600. A manifold melt channel 602 extends through a hot runner manifold 604 and is in fluid communication with a melt source from a machine nozzle (not shown) via a sprue bushing 606. A nozzle 610 is positioned within a nozzle cutout 608 of a cavity plate 609. A nozzle melt channel 612 of nozzle 610 is in fluid communication with manifold melt channel 602 for receiving a melt therefrom. Particularly, the melt passes from manifold melt channel 602 through a manifold outlet 603 into nozzle melt channel 612. Nozzle melt channel 612 carries the melt through a nozzle tip 613 towards a mold gate 614 that leads to a mold cavity 616. Injection molding apparatus 600 includes heaters 615 positioned about nozzle 610 and cooling channels 617 in moldplate 609.

Figure 1:
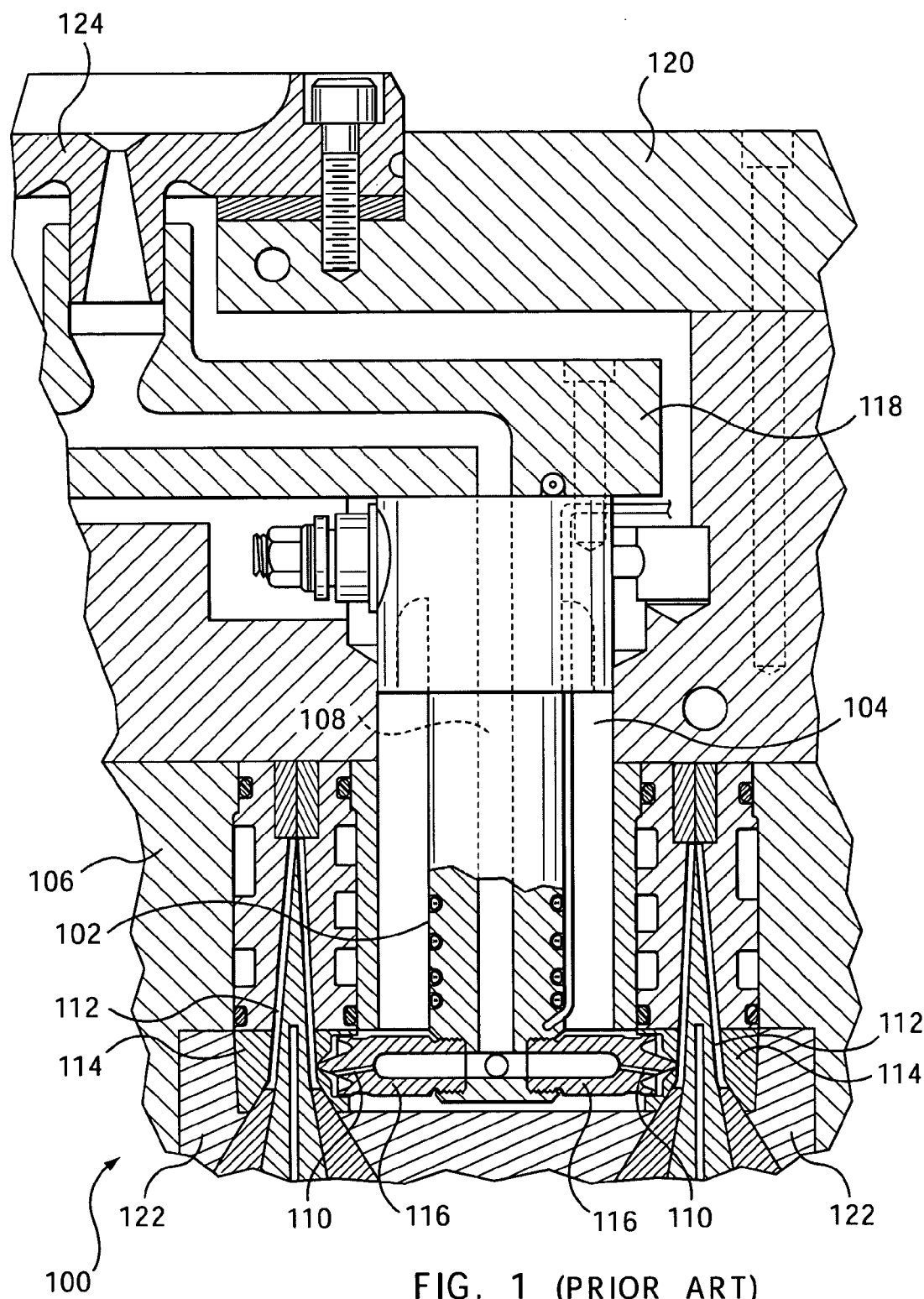
FIG. 1 is a partial cross-sectional view of a conventional edge-gated injection molding apparatus.
Figure 2:
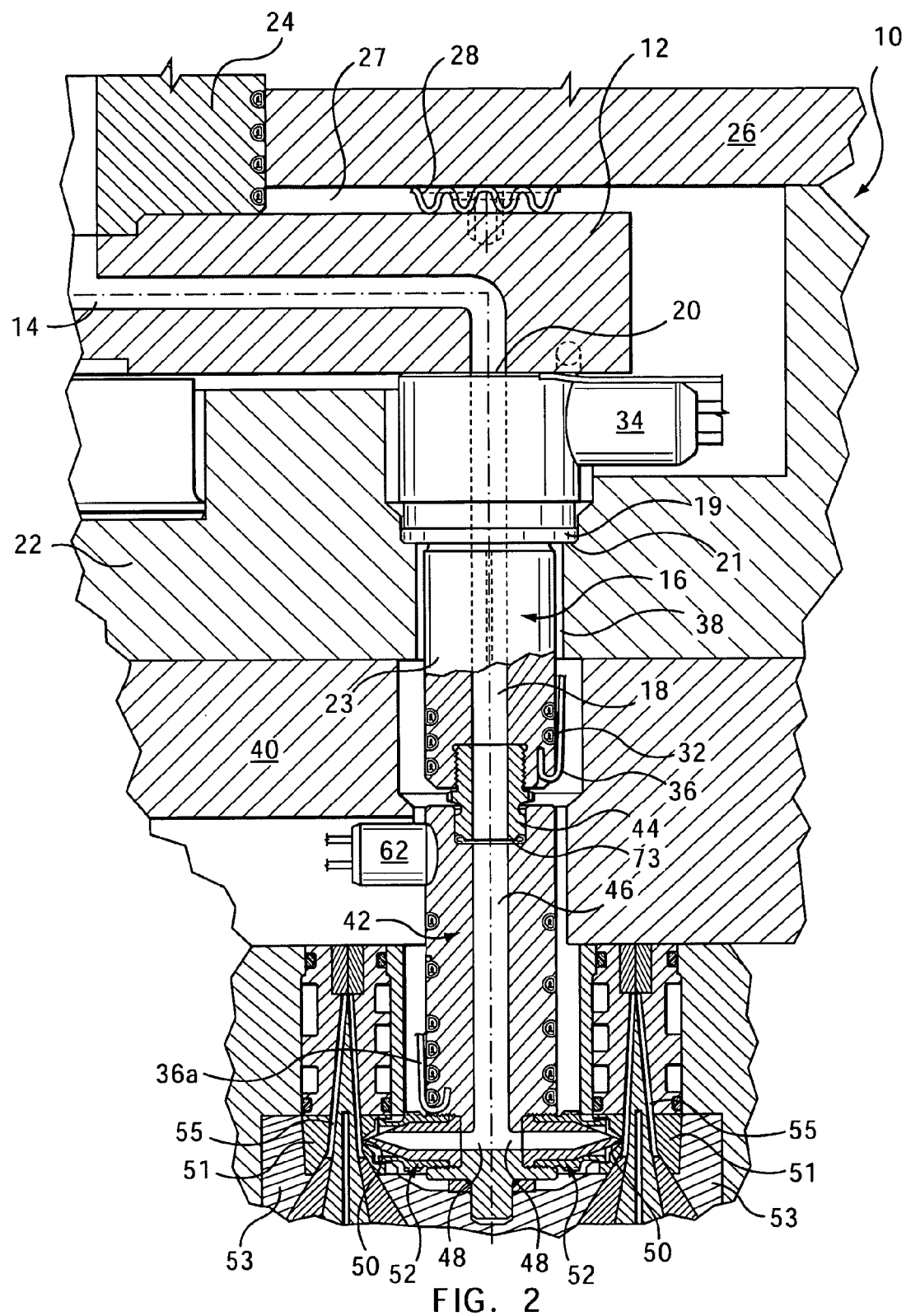
FIG. 2 is a partial cross-sectional view of a portion of an injection molding apparatus according to an embodiment of the present invention.
Figure 3:
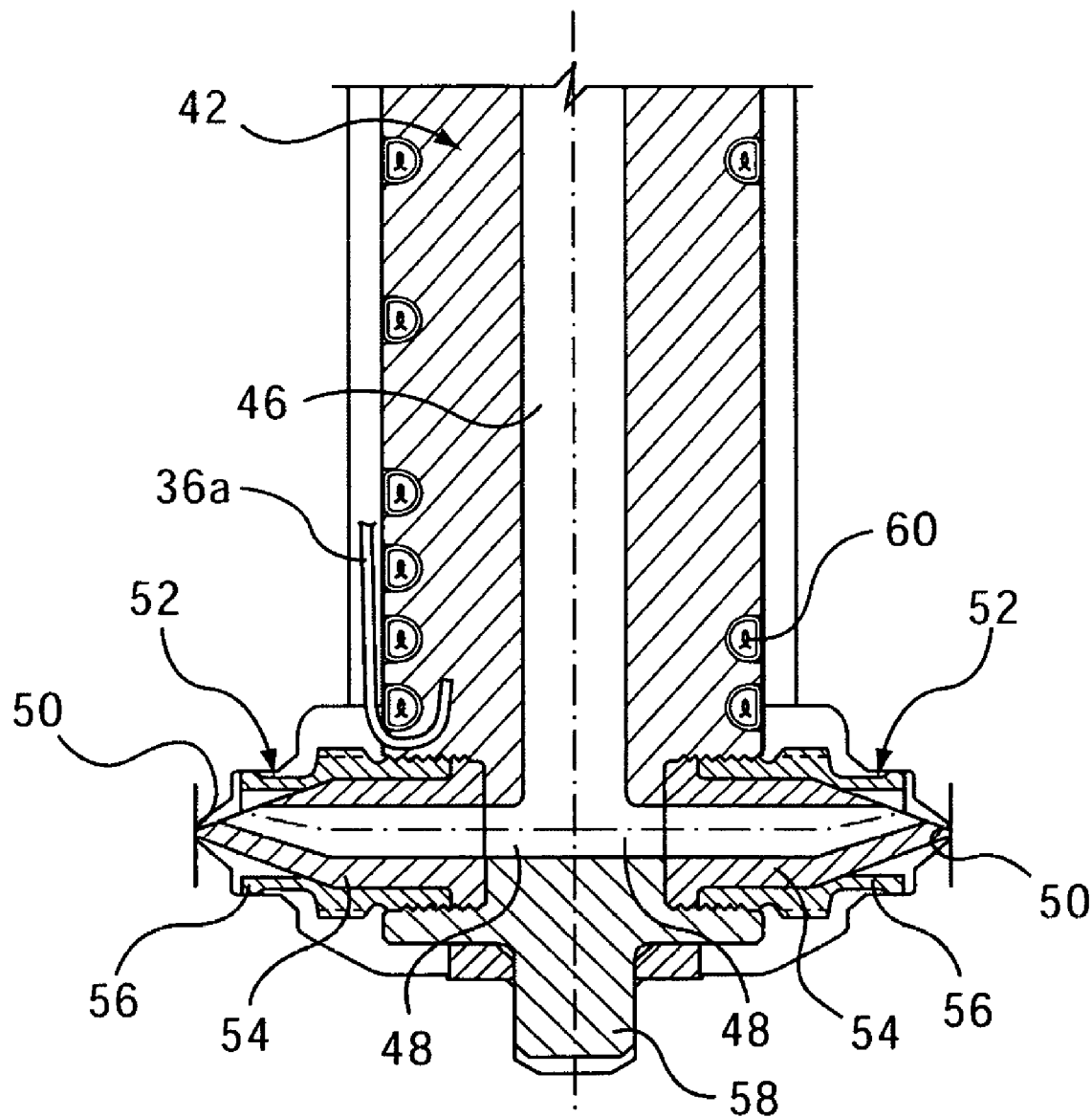
FIG. 3 is an enlarged view of a portion of FIG. 2.
Figure 4:
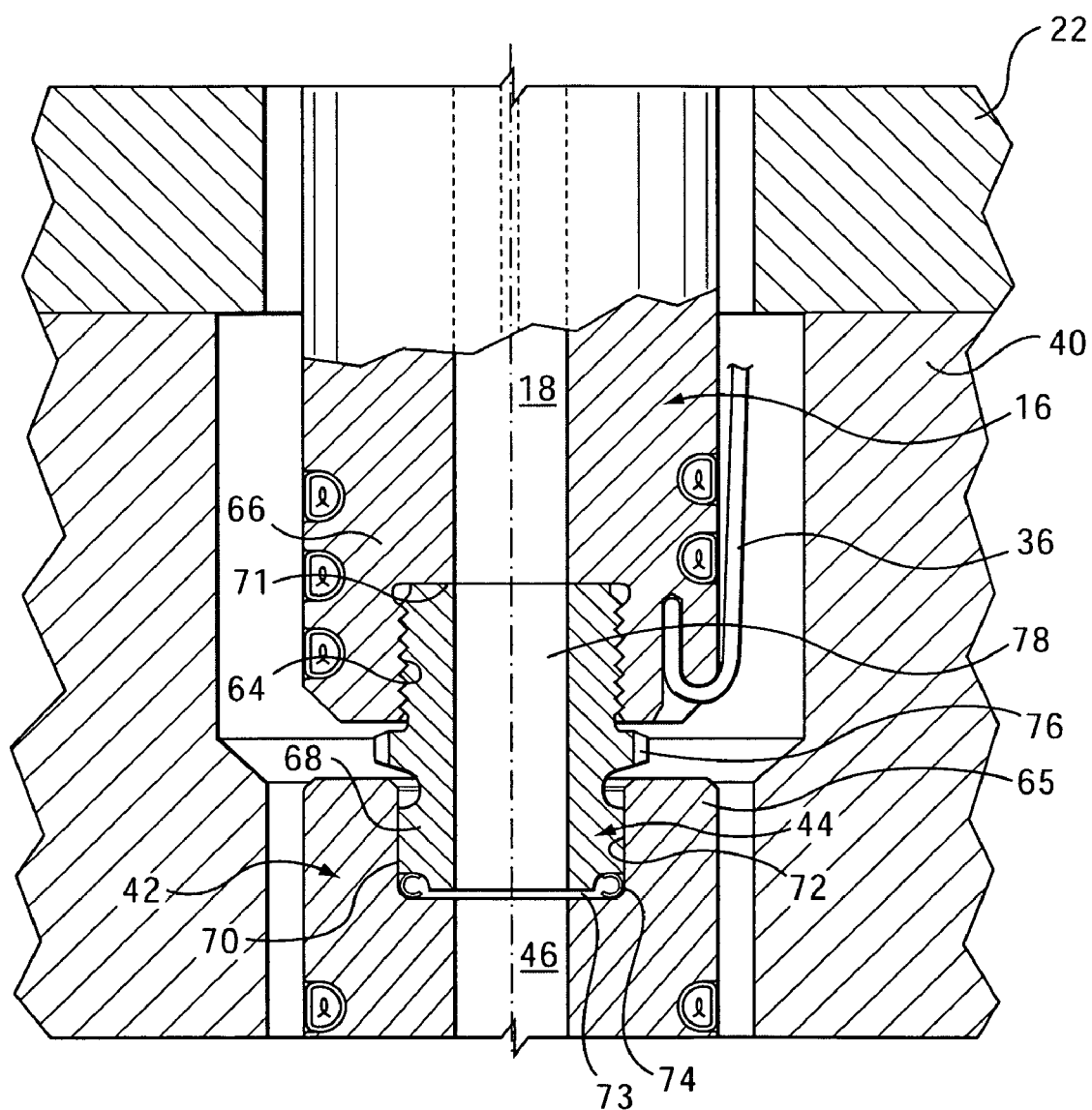
FIG. 4 is an enlarged view of a portion of FIG. 3.

An edge-gated injection molding apparatus in accordance with the present invention is illustrated in FIGS. 2-4 and is generally indicated by reference numeral 10. Injection molding apparatus 10 includes a manifold 12 that is located between a mold plate 22, a sprue bushing 24 and a back plate 26. A disk 28 restricts movement of the manifold 12 relative to the mold plate 22 and back plate 26 to axially fix the position of manifold 12. As such during operation, the manifold is effectively prevented from flexing in a direction of the back plate due to thermal expansion. An air space 27 is provided between the manifold 12 and the back plate 26. A machine nozzle (not shown) delivers a melt stream of molten material under pressure to a manifold channel 14 of the manifold 12 through sprue bushing 24. The disk 28 also helps to focus the force from manifold 12 directly over first nozzle 16 to aid in sealing manifold 12 to first nozzle 16. Disk 28 maintains insulating air gap 27 between manifold 12 and back plate 26. Generally this disk is designed to provide minimum contact between manifold 12 and back plate 26 and is capable of flexing to absorb some of the forces therebetween.

A plurality of first, rear-mounted nozzles 16 are coupled to the manifold 12. Each first nozzle 16 includes a first nozzle melt channel 18 that is aligned with a respective manifold outlet 20 to receive the melt stream from the manifold channel 14. Each first nozzle 16 has a flange portion 19 that sits in a corresponding shoulder portion 21 of mold plate 22. The flange being held in the corresponding shoulder of the mold plate acts to limit axial movement of the rear-mounted nozzle in the direction of a front-mounted nozzle 42 described below. During operation, the rear-mounted nozzle flange and mold plate shoulder arrangement supports the load from the manifold while still allowing the load from the manifold to be used as a sealing means/force between the rear-mounted nozzle and the manifold.

A nozzle body portion 23 of first nozzle 16 extends through an opening 38, which extends through mold plate 22 and a cavity plate 40. Nozzle heaters 32 are coupled about nozzle body 23 of each first nozzle 16 to provide heat thereto. The nozzle heaters 32 are in communication with a power source (not shown) through an electrical connector 34. A thermocouple 36 is coupled to the first nozzle 16 to provide temperature measurements thereof.

With reference to FIGS. 2 and 3, a second, front-mounted nozzle 42 is shown coupled to the first, rear-mounted nozzle 16 by a nozzle link 44, which is described in greater detail below. The second nozzle 42 is an edge-gating nozzle that includes a second nozzle melt channel 46, which is aligned with the first nozzle melt channel 18 of first nozzle 16 for receiving melt therefrom. Gate seals 52 having melt passages 48 laterally extend from second nozzle melt channel 46 to deliver melt through gates 50 to a series of mold cavities 55. Mold cavities 55 are radially spaced around an edge-gated tip portion of the second nozzle 42, as illustrated in FIG. 2.

With reference to FIG. 2, gate seals 52 threadably engage the second nozzle 42 to deliver melt from the melt passages 48 to mold cavities 55 via gates 50. The structure surrounding each gate seal 52 includes a gate insert 51 that is retained by a gate insert retainer 53. Such an arrangement is shown and described in U.S. Pat. No. 5,536,195 to Gellert that is incorporated by reference in its entirety herein.

In the embodiment of FIGS. 2 and 3, gate seals 52 are of a two part construction including a tip 54 that is surrounded by a seal 56. The gate seal 52 may be bi-metallic, for example, the seal 56 may be comprised of H13 steel and the tip 54 may be comprised of carbide or beryllium copper. The seal 56 and tip 54 are not limited to being metallic and therefore, the gate seal 52 may be comprised of any suitable material combination. The seal 56 and the tip 54 may alternatively be comprised of the same material. Gate seals 52 are longitudinally-fixed in position relative to each respective mold gate 50 and mold cavity due to the gate insert and the gate insert retainer, as shown with reference to the embodiment of FIG. 5.

The second nozzle 42 includes a projection 58 that further locates the second, front-mounted nozzle 42 relative to the cavity plate 40. Nozzle heaters 60 and thermocouples 36a are coupled to each second nozzle 42 to measure a temperature of the nozzle and provide heat thereto. The nozzle heaters 60 are in communication with a power source (not shown) through an electrical connector 62.

In the embodiment of the present invention illustrated in FIG. 4, nozzle link 44 includes a first end 64, which is threaded for engaging first nozzle 16 and a second end 68 for engaging the second nozzle 42. First end 64 is disposed in an aperture 71 of a forward end 66 of first nozzle 16. Aperture 71 has corresponding threads to engage the threads of first end 64 of nozzle link 44. The second end 68 of nozzle link 44 is nested in an aperture 72 that is provided in a rear end 65 of second nozzle 42. The second end 68 has a smooth outer surface 70 to allow second nozzle 42 to be slidably removed from the nozzle link 44. The nozzle link 44 includes a melt passage 78 of a constant diameter, which allows melt to flow from the first nozzle melt channel 18 to the second nozzle melt channel 46 without a discernable drop in pressure therebetween.

In cold conditions, a gap 73 is maintained between second end 68 of nozzle link 44 and aperture 72 of second nozzle 42. In operating conditions with the high temperatures thereof, gap 73 of nozzle link 44 is reduced or even consumed by the thermal expansion of the first and second nozzles. A collapsible O-ring 74 is provided between aperture 72 of second nozzle 42 and second end 68 of nozzle link 44 for sealing purposes so that melt does not escape. In the embodiment of the present invention shown in FIG. 4, a tooling projection 76 having a hexagonal outer profile is provided to facilitate installation and removal of the nozzle link 44.

Nozzle link 44 of the present invention allows second nozzle 42 to be removed from first nozzle 16 for repair and maintenance purposes by sliding second nozzle 42 off of nozzle link 44. Further nozzle link 44 is sized to accommodate the thermal expansion, i.e., axial growth, of the first and second nozzles that occurs at the high operating temperatures of an injection molding process. Accordingly in this embodiment of the present invention during operation of the injection molding apparatus, thermal expansion of second nozzle 42 and first nozzle 16 relative to each other is accommodated by gap 73 of nozzle link 44.

In one embodiment of the present invention, nozzle link 44 may be made from a material having a higher thermal conductivity than the nozzles, such that during operation it will expand within aperture 72 of second nozzle 42 to provide an additional sealing means.

In operation, edge-gated injection molding apparatus 10 is heated to an operating temperature, which causes the components including the manifold 12 and first and second nozzles 16, 42 to expand. Manifold 12 is relatively fixed in position on one surface by the interaction between disk 28 and back plate 26 and on the other surface by first nozzle 16, more particularly by the interaction between flange 19 of first nozzle 16 and shoulder 21 of mold plate 22. Gate seals 52 of an edge-gated tip portion of second nozzle 42 are also relatively fixed in position with respect to mold gates 50. As such, the thermal expansion of the system is accommodated by the interaction of nozzle link 44 with first and second nozzles 16, 42.

A melt stream of molten material is delivered under pressure from a machine nozzle (not shown) to manifold channel 14 of manifold 12. The melt is distributed from manifold channel 14 to nozzle melt channels 18 of a plurality of first nozzles 16. The melt flows from the nozzle melt channels 18, through melt passages 78 of nozzle links 44 and into the second nozzle melt channels 46. From the second nozzle melt channels 46, the melt is conveyed through melt passages 48, through gate seals 52, past gates 50 and into a respective mold cavity. Once the injection portion of the cycle is complete, the molded parts are cooled and ejected from the mold cavities.

Figure 5:
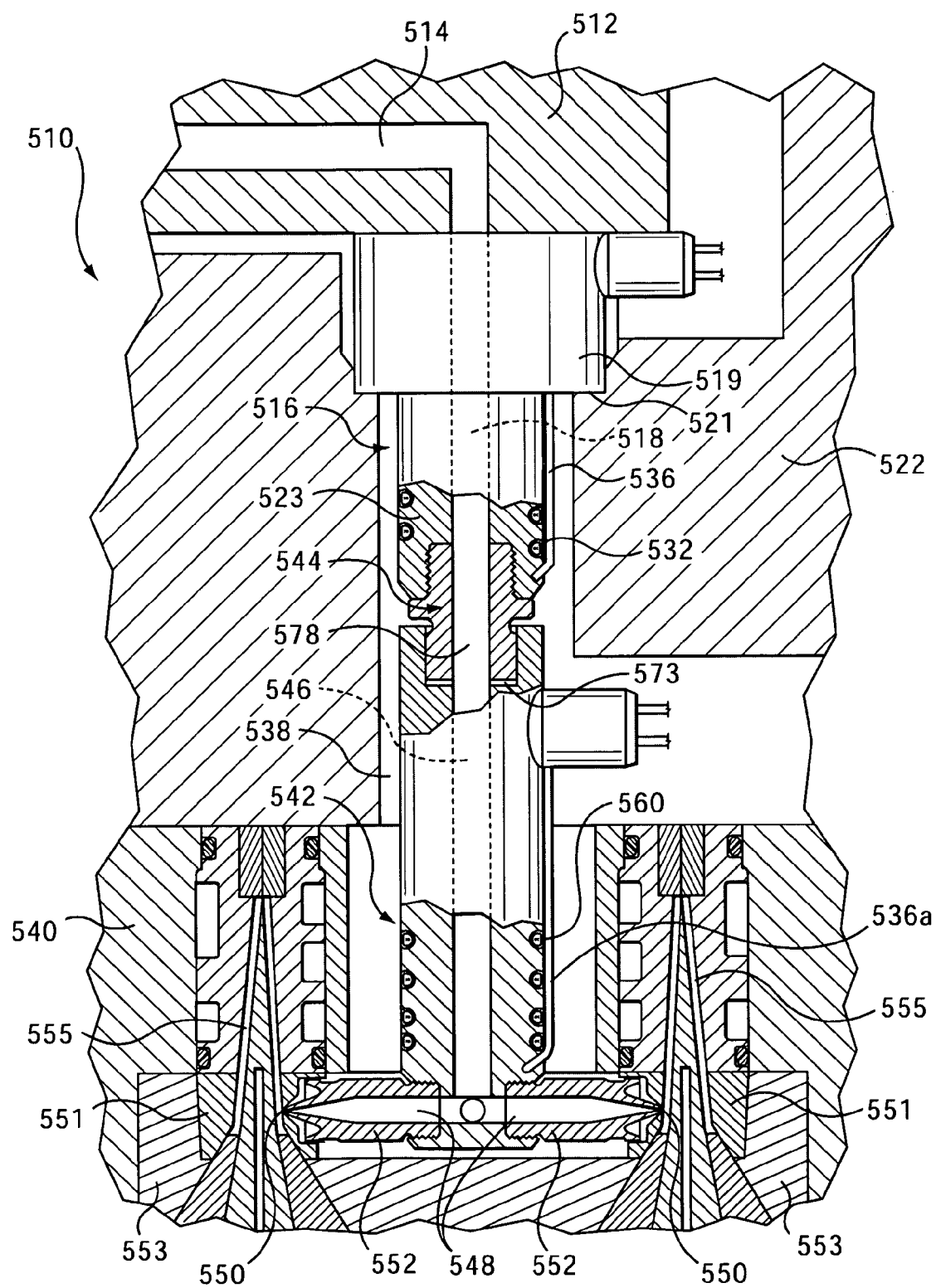
FIG. 5 is a partial cross-sectional view of an edge-gated system according to another embodiment of the present invention.

An edge-gated injection molding apparatus in accordance with another embodiment of the present invention is illustrated in FIG. 5 and is generally indicated by reference numeral 510. Injection molding apparatus 510 includes a manifold 512 having a manifold channel 514 and is relatively fixed in position as described above with reference to the embodiment of FIGS. 2-4.

In this embodiment a plurality of first, rear-mounted nozzles 516 are fluidly coupled to the manifold 512, each of which includes a first nozzle melt channel 518 fluidly coupled to a respective manifold channel 514. First nozzle 516 includes a body portion 523 that extends through an opening 538 of a mold plate 522 and a cavity plate 540. Each first nozzle 516 also includes a flange portion 519 that sits in a corresponding shoulder portion 521 of mold plate 522. The flange being held in the corresponding shoulder of the mold plate to act in limiting axial movement of the rear-mounted nozzle in the direction of a front-mounted nozzle 542 described below. During operation, the rear-mounted nozzle flange and mold plate shoulder arrangement acts in the same manner as described above with reference to the embodiment of FIGS. 2-4.

The embodiment of the present invention illustrated in FIG. 5 includes a second, front-mounted nozzle 542 fluidly coupled to first nozzle 516 by a nozzle link 544, which is described in greater detail below. Second nozzle 542 is an edge-gating nozzle that includes a second nozzle melt channel 546 for receiving melt from first nozzle melt channel 518. Radially extending melt passages 548 branch out from second nozzle melt channel 546 to deliver melt through gates 550 to a series of mold cavities 555. Mold cavities are radially spaced around an edge-gated tip portion of second nozzle 542. The structure surrounding mold cavities 555 includes a gate insert 551 that is retained by a gate insert retainer 553.

One-piece gate seals 552 threadably engage second nozzle 542 to deliver melt from melt passages 548 to mold cavities 555 via mold gates 550. Each gate seal 552 is longitudinally fixed in position relative to each respective mold gate 550 and mold cavity 555 due to its respective gate insert 551 and gate insert retainer 553 being fixed within a mold plate 540.

As illustrated in FIG. 5, each of first nozzle 516 and second nozzle 542 includes a heater 532, 560 and respective thermocouples 536, 536a for heating the melt therein. In the embodiment, nozzle link 544 is coupled to first nozzle 516 and second nozzle 542 in a similar manner as described above with a gap 573 between nozzle link 544 and an aperture of second nozzle 542. Nozzle link 544 includes a: melt passage 578 of a constant diameter, which allows melt to flow from first nozzle melt channel 518 to second nozzle melt channel 546 without an undesirable drop in pressure therebetween. In this embodiment, an O-ring is not used and a sealing force is achieved during operation by the thermal expansion of first nozzle 516 and second nozzle 542 within gap 573 of nozzle link 544.

The embodiment of the present invention of FIG. 5 operates in a like manner as described above with reference to the embodiment of FIGS. 2-4.

Figure 7:
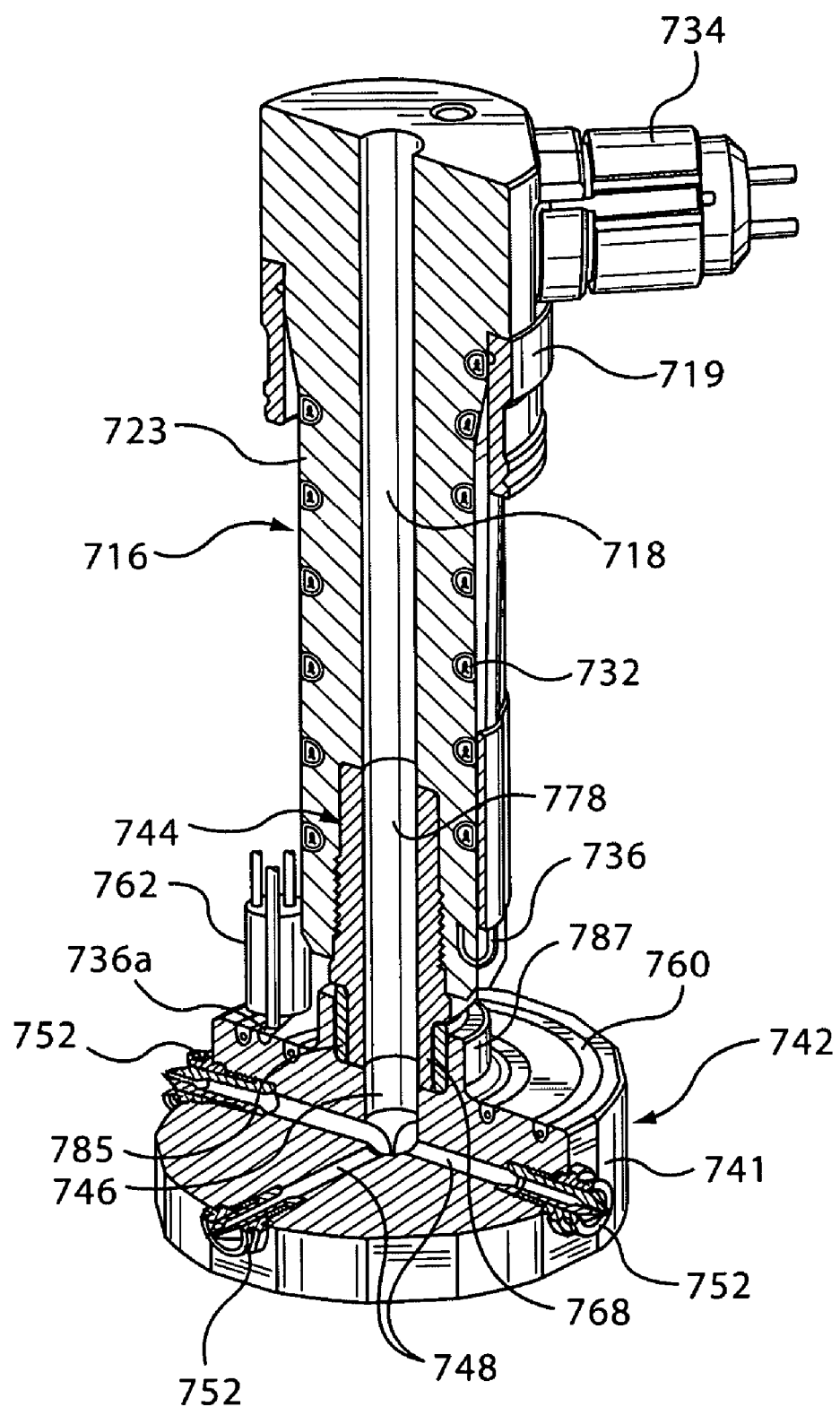
FIG. 7 is a partial cross-sectional view of a portion of an injection molding apparatus according to an embodiment of the present invention.
Figure 8:
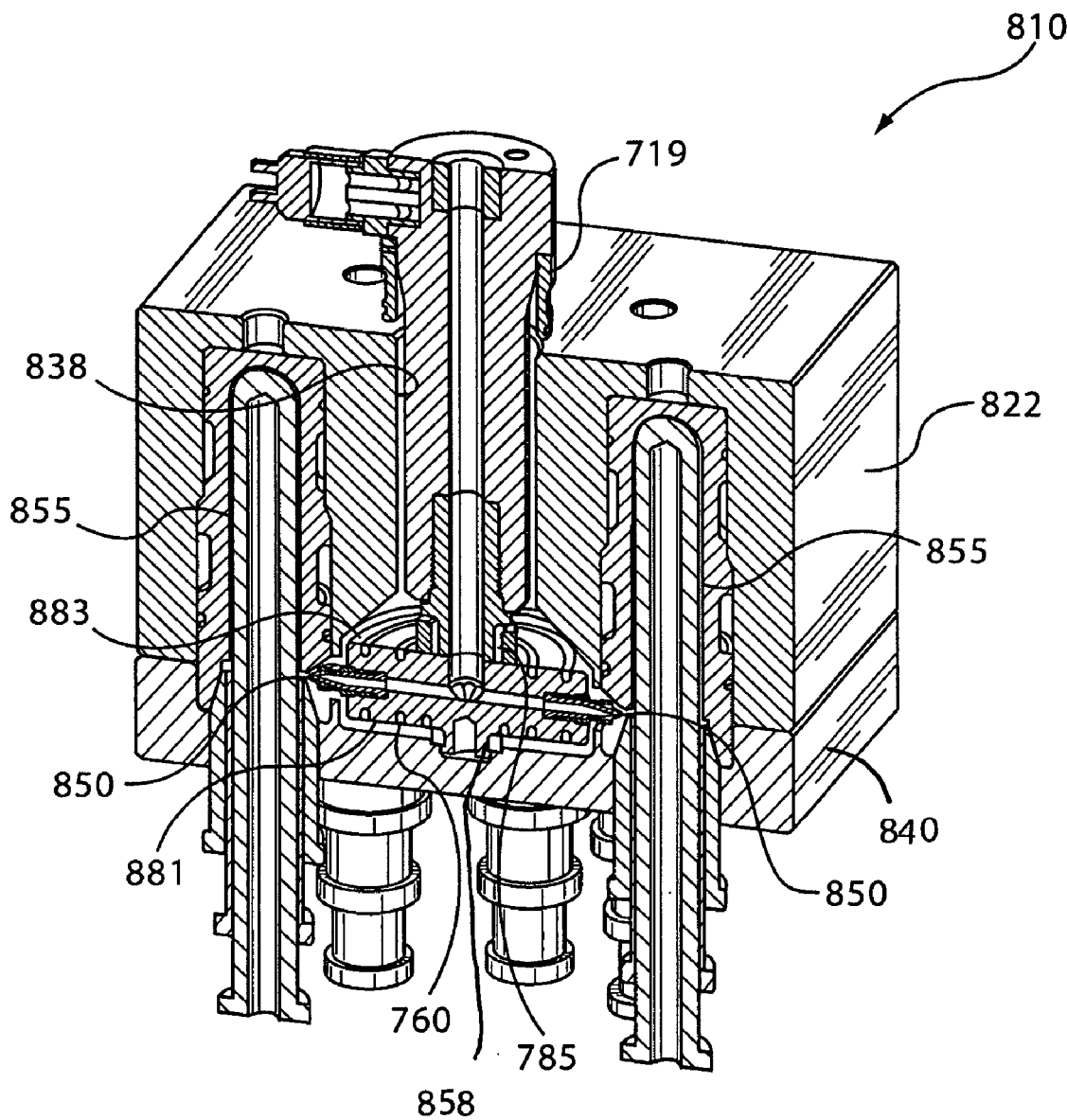
FIG. 8 is a partial cross-sectional view of the embodiment of FIG. 7 in a portion of an edge-gated system.
Figure 9:
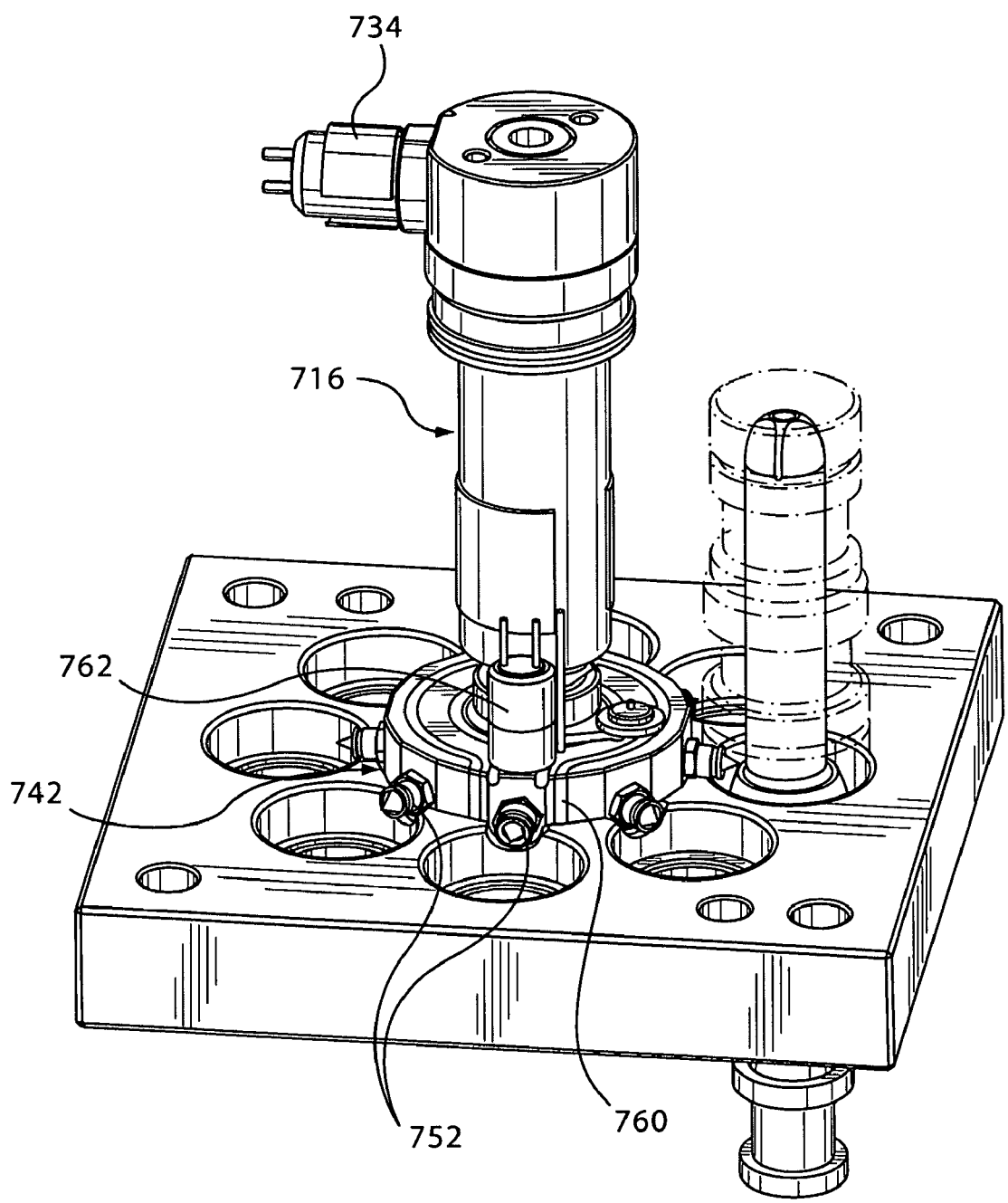
FIG. 9 is a perspective view of the apparatus as shown in FIG. 8 with a mold plate removed.

An edge-gated injection molding apparatus in accordance with another embodiment of the present invention is illustrated in FIGS. 7-9 and is generally indicated by reference numeral 810. Injection molding apparatus 810 includes a manifold (not shown) and is relatively fixed in position as described above with reference to the embodiment of FIGS. 2-4.

In this embodiment, a plurality of first, rear-mounted nozzles 716 are fluidly coupled to the manifold, each of which includes a first nozzle melt channel 718 fluidly coupled to a respective manifold channel (not shown). First nozzle 716 includes a body portion 723 that extends through an opening 838 of a mold plate 822. Each first nozzle 716 also includes a flange portion 719 that sits against mold plate 822. Flange portion 719 may be removable or an integral portion of first nozzle 716. When installed in an injection molding apparatus, the flange is held against the mold plate and acts to limit axial movement of the rear-mounted nozzle in the direction of a front-mounted nozzle 742 described below. During operation, the nozzle flange and mold plate arrangement acts in the same manner as described above with reference to the embodiment of FIGS. 2-4.

The embodiment of the present invention illustrated in FIGS. 7-9 includes second, front-mounted nozzle 742 fluidly coupled to first nozzle 716 by a nozzle link 744, which is described in greater detail below. Second nozzle 742 is an edge-gating nozzle that includes a second nozzle melt channel 746 for receiving melt from first nozzle melt channel 718. Radially extending melt passages 748 branch out from second nozzle melt channel 746 to deliver melt through gates 850 to a series of mold cavities 855. Mold cavities are radially spaced around an edge-gated tip portion of second nozzle 742. Second nozzle 742 has a substantially puck-shaped nozzle body 741 with a circular flange portion 787 extending from a back surface 883 and a projection 858 extending from a front surface 881. Projection 858 locates second nozzle 742 relative to a mold cavity plate 840 to align gates seals 752 with mold gates 850, and to reduce lateral and longitudinal movement of second nozzle 742.

Gate seals 752 threadably engage second nozzle 742 to deliver melt from melt passages 748 to mold cavities 855 via mold gates 850. Each gate seal 752 is longitudinally fixed in position relative to each respective mold gate 850 and mold cavity 855 as shown in FIG. 8. Gate seals 752 can be a two-piece seal, as shown and described above with respect to FIGS. 2 and 3. In the alternative, gate seal 752 can be a one-piece arrangement as shown and described with respect to the embodiment of FIG. 5.

As illustrated in FIG. 7, each of first nozzle 716 and second nozzle 742 includes a heater 732, 760 and respective thermocouples 736, 736a for heating the melt therein. The nozzle heaters 732, 760 are in communication with a power source (not shown) through respective electrical connectors 734, 762. In the present embodiment as shown in FIGS. 8 and 9, heater 760 wraps around a front surface 881 to back surface 883 of second nozzle 742 to beneficially surround gate seals 752 with heat.

In the embodiment of FIGS. 7-9, nozzle link 744 is coupled to first nozzle 716 and second nozzle 742 in a similar manner as described above with a seal 785 between a forward end 768 of nozzle link 744 and flange 787 of second nozzle 742. Seal 785 prevents melt leakage and absorbs the forces of thermal expansion of nozzle link 744. In one embodiment, seal 785 may be made of an insulative material to prevent heat loss at the slidable connection between the nozzle link and second nozzle. Although not shown, nozzle link 744 may seat within flange 787 of second nozzle 742 such that a gap is present between a forward end of the nozzle link and back surface 883 of second nozzle 742 during cold conditions.

Nozzle link 744 includes a melt passage 778 of a constant diameter, which allows melt to flow from first nozzle melt channel 718 to second nozzle melt channel 746 without an undesirable drop in pressure therebetween.

The embodiment of the present invention of FIGS. 7-9 operates in a like manner as described above with reference to the embodiments of FIGS. 2-5.

Figure 10:
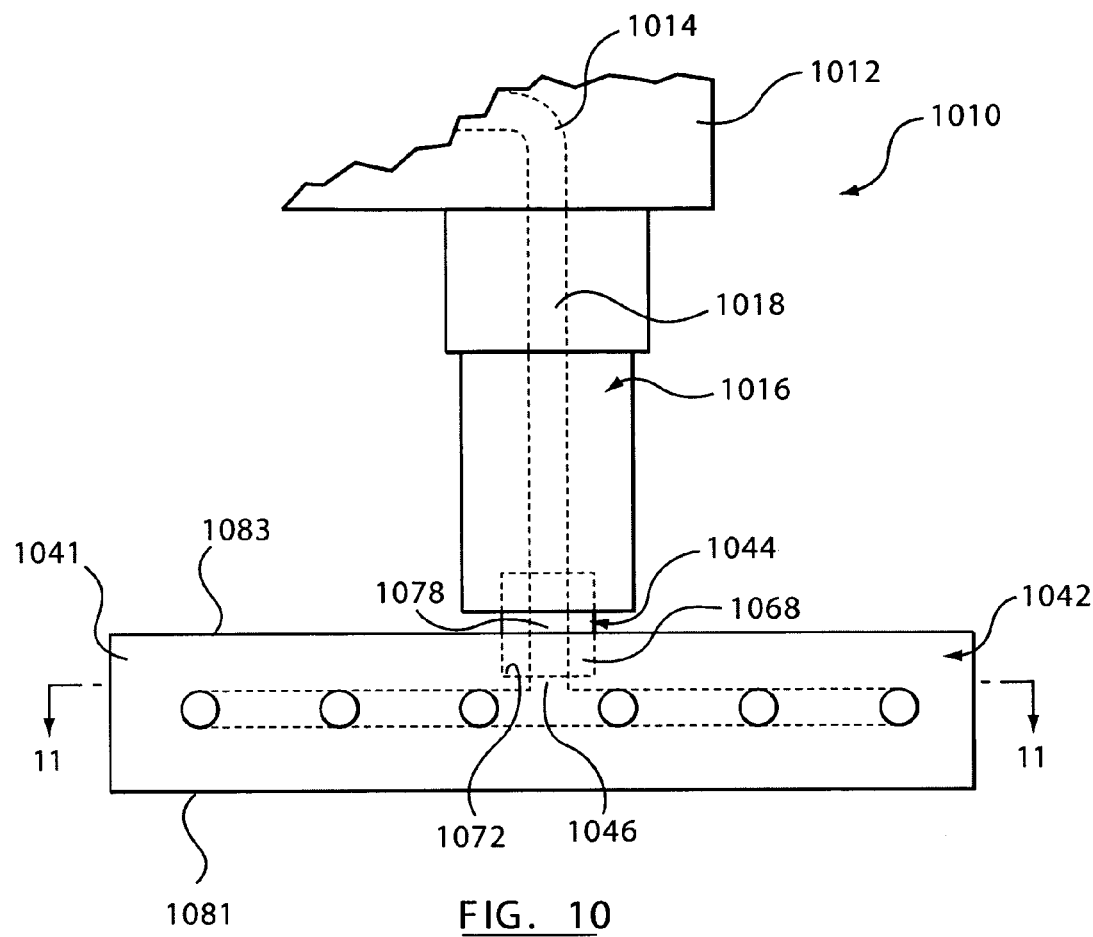
FIG. 10 is a schematic side view of a portion of an injection molding apparatus according to an embodiment of the present invention.
Figure 11:
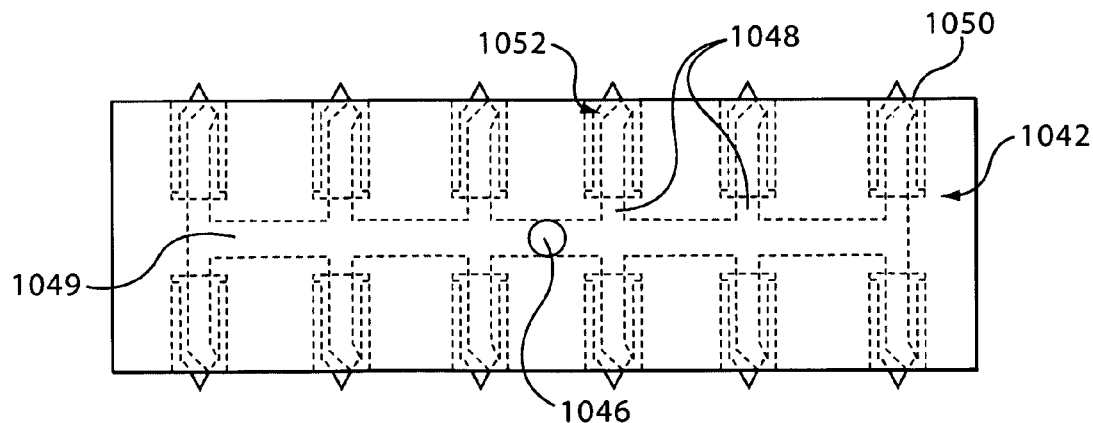
FIG. 11 is a view on 11-11 of FIG. 10.

An edge-gated injection molding apparatus in accordance with another embodiment of the present invention is illustrated in FIGS. 10 and 11 and is generally indicated by reference numeral 1010. This embodiment is similar to the embodiment of FIGS. 7-9, however, second, front mounted nozzle 1042 has a substantially brick-shaped body.

Injection molding apparatus 1010 includes a manifold 1012 that is relatively fixed in position as described above with reference to the embodiment of FIGS. 2-4. A first, rear mounted nozzle 1016 having a first nozzle melt channel 1018 is coupled to the manifold 1012. First nozzle melt channel 1018 receives melt from a manifold channel 1014. Second, front mounted nozzle 1042 is an edge-gating nozzle that includes a second nozzle melt channel 1046 for receiving melt from the first nozzle melt channel 1018 and distributing the melt to a plurality of melt passages 1048. The second nozzle 1042 is coupled to the first nozzle 1016 by a nozzle link 1044, which includes a melt passage 1078. Nozzle link 1044 is similar to the nozzle links 44, 544 and 744 of the previously described embodiments and therefore will not be described in detail here. In the cold condition, a gap (not shown) may be present between a forward end 1068 of the nozzle link 1044 and an aperture 1072 of the second nozzle 1042, in which the forward end 1068 is seated. Further, a seal may surround the forward end 1068 of the nozzle link 1044 similar to the embodiment of FIGS. 7-9.

Melt passages 1048 branch outwardly from a connector melt channel 1049 that links the second nozzle melt channel 1046 to the melt passages 1048 to deliver melt through gates 1050 to a series of mold cavities (not shown). The mold cavities are spaced about substantially brick shaped body 1041 of the second nozzle 1042. The second nozzle 1042 may be any shape in which the length of the second nozzle 1042, as measured along an axis of the second nozzle melt channel 1046 of the second nozzle 1042, is less than one or both of the width and the depth of the second nozzle 1042.

In the substantially puck-shaped embodiment of FIGS. 7-9, the width and the depth are equal to the diameter of the circular front and back surfaces 881, 883 of the second nozzle 742, such that the length of second nozzle 742 is less than the width/depth of the second nozzle.

Gate seals 1052 threadably engage second nozzle 1042 to deliver melt from melt passages 1048 to the mold cavities via mold gates 1050. Each gate seal 1052 is longitudinally fixed in position relative to each respective mold gate 1050. Gate seals 1052 may be of a two piece construction, as shown in FIGS. 2 and 3, or a one piece construction, as shown in FIG. 5. First and second nozzles 1016 and 1042 are further provided with first and second heaters (not shown) respectively and first and second thermocouples (not shown). The second heater of second nozzle 1042 wraps around a front surface 1081 to a back surface 1083 of second nozzle 1042 to heat the gate seals 1052, similar to the embodiment shown in FIGS. 7-9.

The embodiment of FIGS. 10 and 11 operates in a like manner as described above with reference to the embodiments of FIGS. 2-5 and 7-9.

Figure 12:
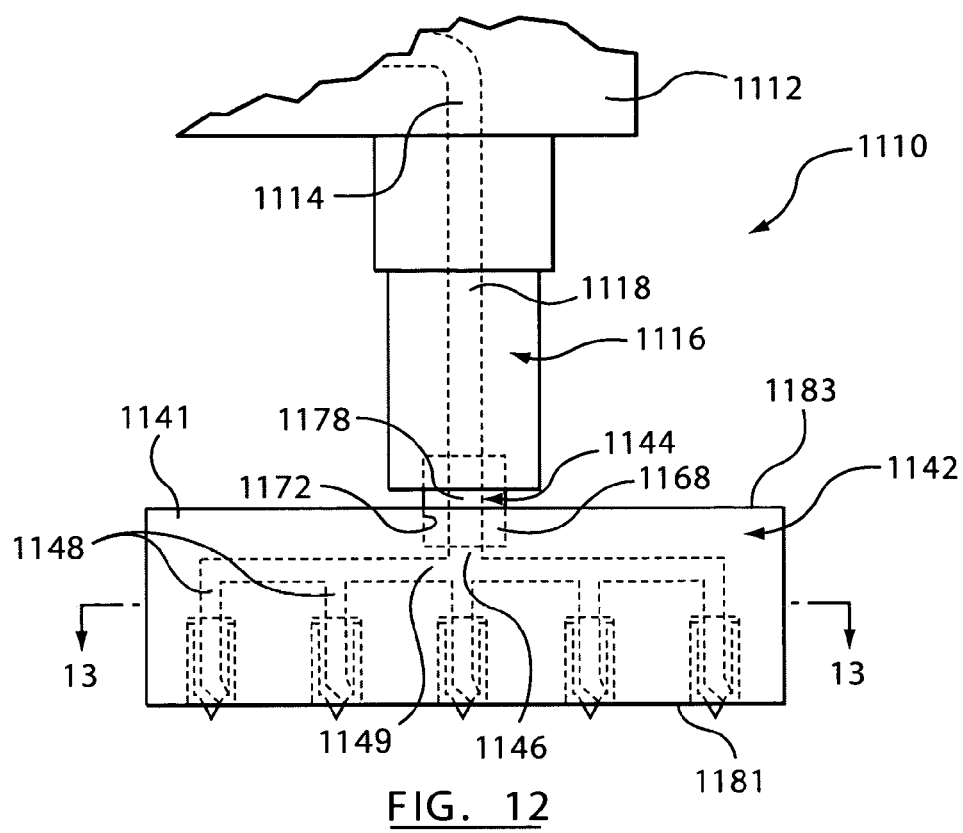
FIG. 12 is a schematic side view of a portion of an injection molding apparatus according to an embodiment of the present invention.

An injection molding apparatus in accordance with another embodiment of the present invention is illustrated in FIG. 12 and is generally indicated by reference numeral 1110. In this embodiment, a first, rear mounted nozzle 1116 having a first nozzle melt channel 1118 is coupled to a manifold 1112. First nozzle melt channel 1118 receives melt from a manifold channel 1114. A second, front mounted nozzle 1142 is includes a second nozzle melt channel 1146 for receiving melt from the first nozzle melt channel 1118 and distributing the melt to a plurality of melt passages 1148. The second nozzle 1142 is coupled to the first nozzle 1116 by a nozzle link 1144 having a melt passage 1178. Nozzle link 1144 is similar to the nozzle links 44, 544, 744 and 1044 of the previous embodiments and therefore will not be described in detail here. In the cold condition, a gap (not shown) may be present between a forward end 1168 of the nozzle link 1144 and an aperture 1172 of the second nozzle 1142, in which the forward end 1168 is seated. Further, a seal may surround the forward end 1168 of the nozzle link 1144 similar to the embodiment of FIGS. 7-9.

Figure 13A:
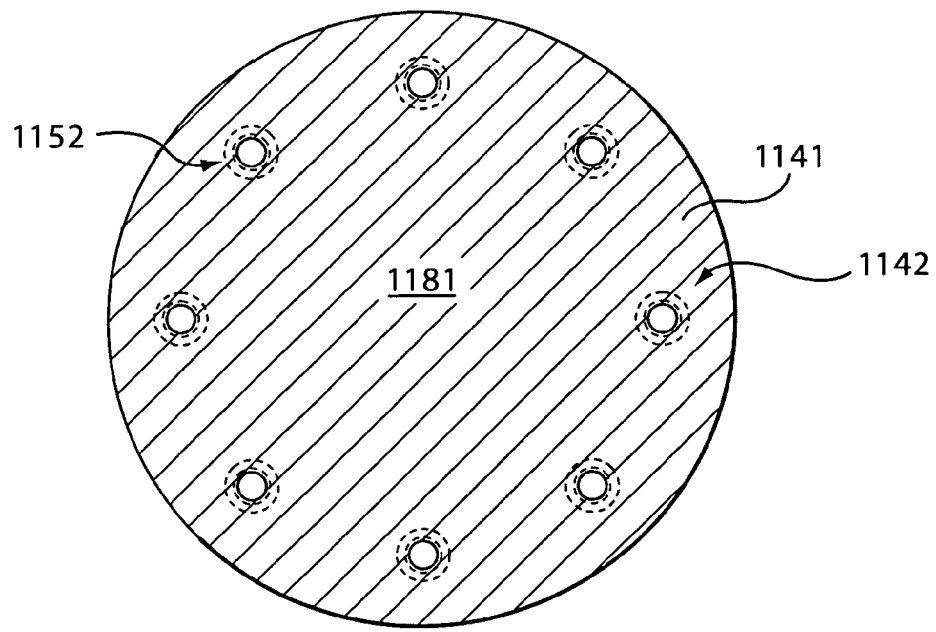
FIG. 13A is a view on 13-13 of FIG. 12.

A connector melt channel 1149 receives melt from the second nozzle melt channel 746 and distributes the melt to melt passages 1148, which extend forward from the connector melt channel 1149. The melt passages 1148 deliver melt through gates 1150 to a series of mold cavities (not shown), which are located forward of second nozzle 1142. As shown in FIG. 13A, second nozzle 1142 includes a substantially puck-shaped body 1141. Gate seals 1152 threadably engage second nozzle 1142 and are evenly spaced about a generally circular front surface 1181 of the second nozzle 1142. Gate seals 1152 deliver melt from melt passages 1148 to the mold cavities via mold gates (not shown). Each gate seal 1152 is longitudinally fixed in position relative to its respective mold gate. In one embodiment, second nozzle 1142 includes a projection (not shown) on a front surface that cooperates with a recess within a mold cavity plate (not shown) to longitudinally fix the position of gate seals 1152 relative to their respective mold gates, similar to projection 858 and mold cavity plate 840 of FIG. 8. In a further embodiment, second nozzle 1142 maybe positioned between cavity plates (not shown) proximate its front and back surfaces that cooperate to longitudinally fix the position of gate seals 1152 relative to their respective mold gates.

Gate seals 1152 may be of a two piece construction, as shown in FIGS. 2 and 3, or a one piece construction, as shown in FIG. 5. First and second nozzles 1116 and 1142 are respectively provided with first and second heaters (not shown) and first and second thermocouples (not shown). The second heater may wrap around a front surface 1181 to a back surface 1183 of second nozzle 1142 to heat the gate-seals 1152 in a similar manner as the second heater in the embodiment of FIGS. 7-9.

Figure 13B:
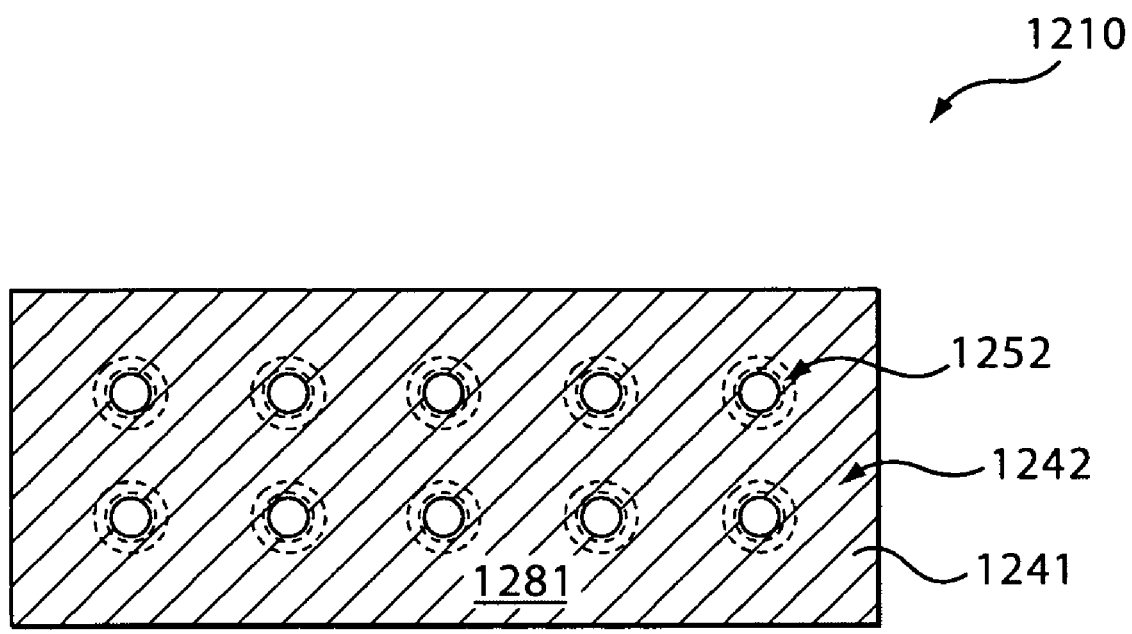
FIG. 13B is a view on 13-13 of FIG. 12 showing another embodiment of the present invention.

Referring to FIG. 13B, another embodiment of an injection molding apparatus 1210 is shown. This embodiment is similar to the embodiment of FIGS. 12 and 13A, however, instead of a substantially puck-shaped body, second nozzle 1242 includes a substantially brick shaped body 1241.

Injection molding apparatus 1210 includes gate seals 1252 that threadably engage second nozzle 1242 and are spaced about a generally rectangular shaped front surface 1281 of the second nozzle 1242. The gate seals 1252 deliver melt from melt channels (not shown) that receive melt from second nozzle melt channel (not shown) of second nozzle 1242 to mold cavities (not shown).

Figure 14:
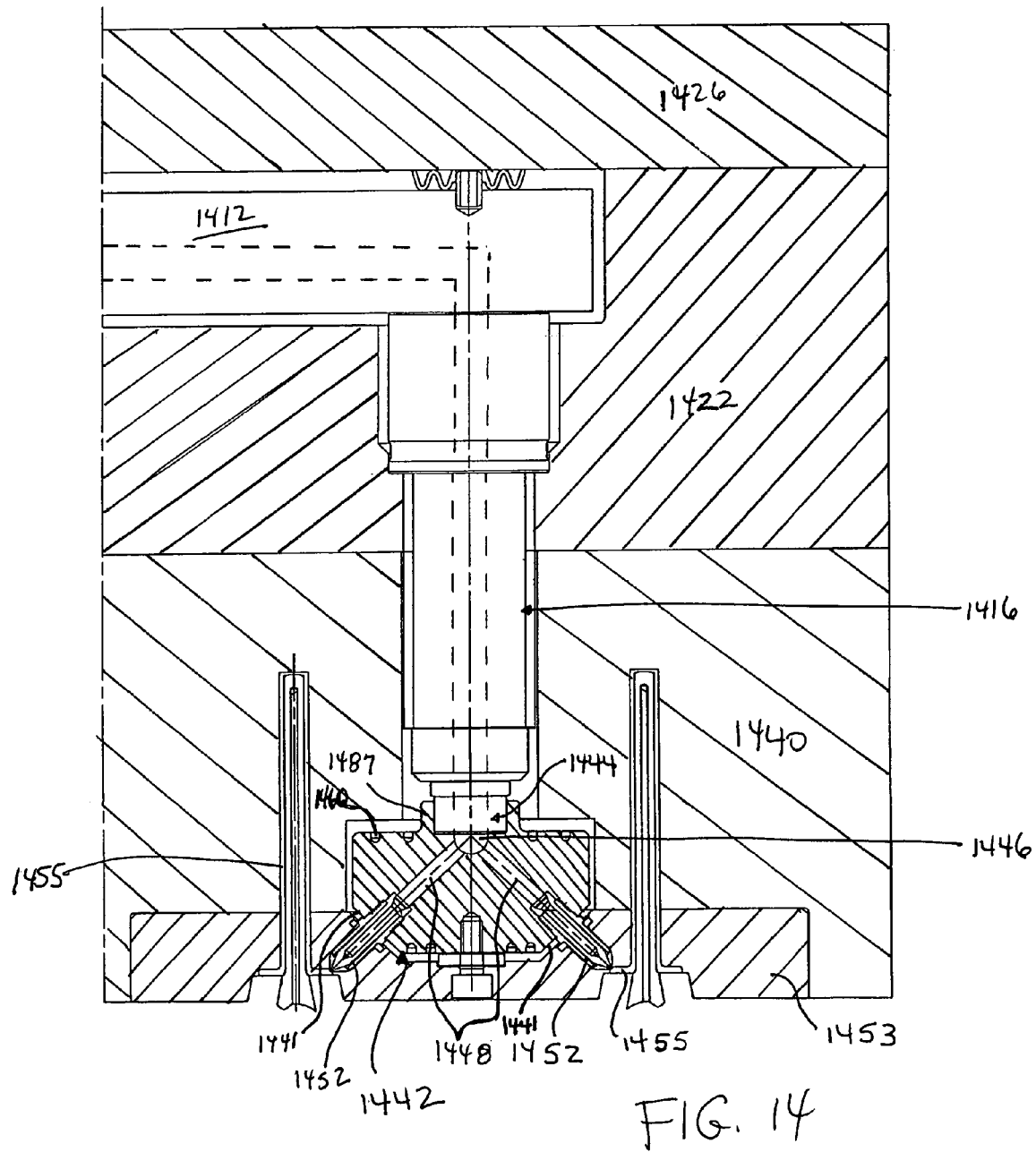
FIG. 14 is a partial cross-sectional view of a portion of an injection molding apparatus according to an embodiment of the present invention.

FIG. 14 is a partial cross-sectional view of a portion of an injection molding apparatus according to another embodiment of the present invention. Similar to the embodiment shown in FIGS. 7-9, a first nozzle 1416 connects to a nozzle link 1444 that is slidably coupled to a circular flange portion 1487 of a second nozzle 1442. Similarly shown is the arrangement of first nozzle 1416 and second nozzle 1442 between a manifold 1412, a back plate 1426, mold plates 1422, 1440 and a gate insert retainer 1453, the function of each in this arrangement is apparent to one of ordinary skill in the art. However in the embodiment shown in FIG. 14, second nozzle 1442 includes a second nozzle melt channel 1446 with a plurality of melt passages 1448 that extend at an angle from a forward end of the second nozzle melt channel. Melt passages 1448 are angled to guide a melt stream toward a plurality of gate seals 1452 coupled to angled forward surfaces 1441 of second nozzle 1442. Due to the arrangement of the first and second nozzles and the nozzle link, the gate seals may be relatively fixed in position to provide alignment with a plurality of mold gates, because thermal expansion during operation is accommodated by nozzle link 1444, as described above with reference to the previous embodiments.

Accordingly, the embodiments of the present invention do not require that the manifold "float" to accommodate the thermal expansion of the system during operation. Instead, the manifold and nozzle gate seals may both be relatively fixed in longitudinal position because the nozzle link allows for thermal expansion within the intersection of the first and second nozzles.

In each embodiment of the present invention described above, in order to gain access to the gate seals or the second nozzles for repair or regular scheduled maintenance, the cavity plate need only be removed without disturbing the remainder of the injection molding apparatus. The second nozzle may then be slidably removed from the nozzle link to allow for repair or replacement. The gate seals are also removable from the second nozzles and may similarly be repaired or replaced.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having at least one manifold melt channel for receiving a melt stream of moldable material under pressure;
   a first nozzle having a first nozzle melt channel in fluid communication with said manifold melt channel;
   a second nozzle having a second nozzle body, a second nozzle melt channel in fluid communication with said first nozzle melt channel and a plurality of outwardly extending melt passages in fluid communication with said second nozzle melt channel, said nozzle body having a length measured along a longitudinal axis of the second nozzle, a width and a depth;
   a nozzle link provided between the first nozzle and the second nozzle and having a nozzle link melt passage for fluidly coupling the first nozzle melt channel and the second nozzle melt channel, the nozzle link being threadably attached to the first nozzle and slidable within an aperture of the second nozzle; and
   a plurality of gate seals coupled to said second nozzle, said plurality of gate seals for delivering the melt stream from said plurality of outwardly extending melt passages to a plurality of mold cavities through respective mold gates, wherein the length of said second nozzle body is less than at least one of said width and said depth of said second nozzle body.

2. The injection molding apparatus of claim 1, wherein said plurality of outwardly extending melt passages extend radially from said second nozzle melt channel to said plurality of mold cavities.

3. The injection molding apparatus of claim 1, further comprising:
   a connector melt channel provided between said second nozzle melt channel and said plurality of outwardly extending melt passages.

4. The injection molding apparatus of claim 2, wherein said second nozzle body is substantially puck-shaped.

5. The injection molding apparatus of claim 3, wherein said second nozzle body is substantially puck-shaped.

6. The injection molding apparatus of claim 5, wherein said outwardly extending melt passages extend toward a front end of said second nozzle.

7. The injection molding apparatus of claim 3, wherein said nozzle body is substantially brick-shaped.

8. The injection molding apparatus of claim 1, further comprising:
   a seal between a forward end of said nozzle link and said aperture of said second nozzle.

9. The injection molding apparatus of claim 8, wherein the seal is annular and made of a thermally insulative material.

10. The injection molding apparatus of claim 1, wherein under operating conditions said gate seals are longitudinally fixed in position and thermal expansion of said second nozzle is accommodated by said nozzle link.

11. The injection molding apparatus of claim 10, wherein said manifold is longitudinally fixed in position such that under operating conditions thermal expansion of said first nozzle is accommodated by said nozzle link.

12. The injection molding apparatus of claim 1, further comprising:
   a first heater coupled to said first nozzle; and
   a second heater coupled to said second nozzle, wherein said second heater is in contact with both a front surface and a back surface of said second nozzle body.

13. The injection molding apparatus of claim 1, wherein said second nozzle is axially slidable relative to said nozzle link under operating conditions.

14. The injection molding apparatus of claim 1, wherein said nozzle link melt passage is of a substantially constant diameter.

15. An injection molding apparatus comprising:
   a manifold having at least one manifold melt channel for receiving a melt stream of moldable material under pressure;
   a first nozzle having a first nozzle melt channel in fluid communication with said manifold melt channel;
   a second nozzle having a nozzle body, a second nozzle melt channel in fluid communication with said first nozzle melt channel and a plurality of outwardly extending melt passages in fluid communication with said second nozzle melt channel;
   a nozzle link provided between the first nozzle and the second nozzle and having a nozzle link melt passage of a substantially constant diameter for fluidly coupling the first nozzle melt channel and the second nozzle melt channel, the nozzle link being threadably attached to the first nozzle and slidable within an aperture of the second nozzle, wherein said second nozzle is axially slidable relative to said nozzle link under operating conditions; and
   a plurality of gate seals coupled to said second nozzle, said plurality of gate seals for delivering the melt stream from said plurality of outwardly extending melt passages to a plurality of mold cavities through respective mold gates.

16. The injection molding apparatus of claim 15, wherein said plurality of outwardly extending melt passages radially extend from the second nozzle melt channel and said second nozzle body is substantially puck-shaped.

17. The injection molding apparatus of claim 15, wherein a length of said second nozzle body measured along a longitudinal axis of the second nozzle is less than at least one of a width of said nozzle body and a depth of said nozzle body.

18. The injection molding apparatus of claim 17, wherein said second nozzle body is substantially brick shaped.

19. The injection molding apparatus of claim 15, further comprising:
   a first heater coupled to said first nozzle; and
   a second heater coupled to said second nozzle, wherein said second nozzle heater is in contact with both a front surface and a back surface of said second nozzle body.

20. The injection molding apparatus of claim 15, wherein said plurality of mold cavities are located forward of a front surface of said second nozzle, and said outwardly extending melt passages extend toward the front surface of said second nozzle to deliver the melt to the mold cavities.

21. The injection molding apparatus of claim 15, wherein said first nozzle comprises a first material have a first thermal conductivity, said second nozzle comprises a second material have a second thermal conductivity, and said nozzle link comprises a third material have a third thermal conductivity, wherein the third thermal conductivity is higher than the first thermal conductivity and the second thermal conductivity.

22. The injection molding apparatus of claim 21, wherein the first material and the second material are the same.

23. The injection molding apparatus of claim 15, wherein said outwardly extending melt passages extend toward a front surface of said second nozzle, and said plurality of gate seals are coupled to said front surface of said second nozzle.

24. The injection molding apparatus of claim 1, wherein said first nozzle comprises a first material have a first thermal conductivity, said second nozzle comprises a second material have a second thermal conductivity, and said nozzle link comprises a third material have a third thermal conductivity, wherein the third thermal conductivity is higher than the first thermal conductivity and the second thermal conductivity.

25. The injection molding apparatus of claim 24, wherein the first material and the second material are the same.

26. The injection molding apparatus of claim 1, wherein said outwardly extending melt passages extend toward a front surface of said second nozzle, and said plurality of gate seals are coupled to said front surface of said second nozzle.

* * * * *